Feb. 12, 1952 E. F. LEWIS 2,585,022
RINGING CURRENT SUPPLY SYSTEM FOR TELEPHONES
Filed Aug. 19, 1948
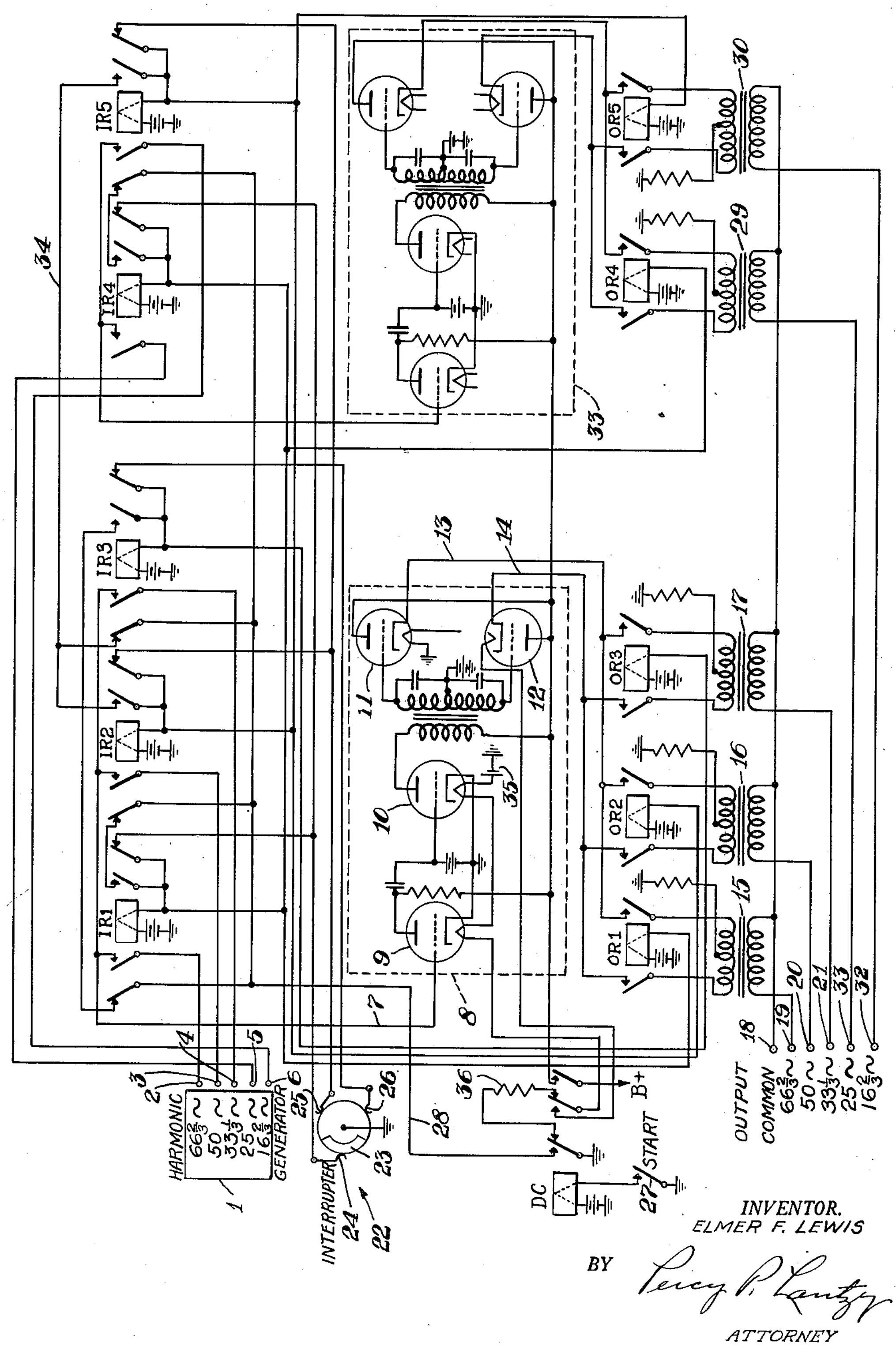
INVENTOR.
ELMER F. LEWIS
BY Percy P. Lantzy
ATTORNEY Patented Feb. 12, 1952

2,585,022

UNITED STATES PATENT OFFICE 2,585,022

RINGING CURRENT SUPPLY SYSTEM FOR TELEPHONES

Elmer F. Lewis, Montclair, N. J., assignor to Federal Telephone and Radio Corporation, New York, N. Y., a corporation of Delaware Application August 19, 1948, Serial No. 45,168

7 Claims. (Cl. 179—84)

This invention relates to telephone systems which are provided with tuned ringers of the type generally used on party lines, each ringer being selectively responsive only to alternating current of a particular frequency, and is especially directed to an improved supply system for currents of the proper frequencies and amplitude.

In supply systems of this type it is desirable to provide for amplification of currents from a primary source; but as each frequency is preferably supplied by the system on a separate line, the provision of an amplifier for each frequency involves considerable duplication and expense.

An object of this invention is to provide a supply system of this type in which a single amplifier unit is utilized to amplify a plurality of frequencies.

This is in general accomplished by taking advantage of the fact that ringing practice includes a short ringing period followed by a period of silence which usually is longer than the ringing period. According to the invention, an amplifier unit is connected successively to sources of different frequencies, being connected to a given source during the ringing period and to the other sources during the silence period for the given source. For instance, when a ringing period of two seconds is followed by four seconds of silence, as in the example hereafter given, three current frequencies can be amplified by the same amplifier without interference with normal ringing procedure. The invention is particularly applicable to harmonic ringing systems and will be illustrated by an embodiment of this type.

A further object is to provide a plurality of amplifier units and a control arrangement which utilizes each unit to amplify a plurality of currents of different frequencies.

Another object is to establish a stand-by arrangement for an amplifier unit which will prevent waste of power when no ringing output is required, but will keep the amplifier in condition for prompt operation when needed.

Other objects and advantages will appear from the following description and the accompanying drawing, which is a diagram of a supply system embodying the invention.

In the illustrated example a harmonic generator 1 is employed, producing five harmonic frequencies of 66⅔, 50, 33⅓, 25 and 16⅔ cycles per second at terminals 2, 3, 4, 5 and 6, respectively. The system is arranged for use with a ringing system in which each ringing period is half of the subsequent silence period, such as two seconds ringing and four seconds silence, as already noted. This makes it possible to amplify three frequencies on one amplifier; and in the example two simultaneously operated units are provided, one for the first three frequencies and the other for the last two.

In the first unit, supply terminals 2, 3, and 4 of generator 1 are connected to the left inner armatures of input relays IR1, IR2 and IR3, respectively, the work contacts of said armatures being connected to input line 7 which extends to the input of amplifier 8, enclosed in dash lines. This amplifier is shown somewhat diagrammatically, circuit elements that are not pertinent to the invention being omitted. Line 7 is connected to the first stage amplifier tube 9, resistance coupled to the second stage amplifier tube 10, which in turn is transformer coupled to a push-pull stage employing tubes 11 and 12. The amplifier may advantageously be designed to operate as a class AB1 amplifier with a cathode follower output.

The output from amplifier 8 is carried by lines 13 and 14 from tubes 11 and 12, line 13 being connected to the left work contacts of output relays OR1, OR2 and OR3, while line 14 is connected to the right work contacts of the latter relays. The armatures of each of said relays are connected across the primary of a transformer 15, 16 or 17 respectively, the secondaries of the transformers being connected at one side to the common circuit terminal 18. At the other side the secondary of transformer 15 is connected to 66⅔ cycle output terminal 19, that of transformer 16 is connected to 50 cycle output terminal 20, and the secondary of transformer 17 to 33⅓ cycle output terminal 21.

A control arrangement is provided for energizing relays IR1 and OR1 for two seconds, thereafter operating relays IR2 and OR2 for two seconds, followed by IR3 and OR3 for two seconds, after which the cycle of operation is repeated. For this purpose a source of impulses at two second intervals is provided, the illustrated example employing a rotary interrupter 22 of well-known type, with a rotating contact segment 23 connected to ground, and three equally spaced brushes 24, 25 and 26. In the form shown, segment 23 extends over about 120°, with a complete rotation in six seconds, so that each brush is connected for approximately two seconds.

Brush 24 is connected to the right outer rest contact of relay IR1, brush 25 to that of relay IR2, and brush 26 to the corresponding contact of relay IR3. The energizing circuits of the latter three relays are cyclically interconnected, the right inner work contact of each being connected to the left outer rest contact of the succeeding relay, the armatures associated with the latter contacts being connected to the inner work contact of starting relay DC, the corresponding armature of relay DC being grounded. The two right armatures of each input relay are connected to the relay energizing circuit, which extends through the relay to battery and ground, and said armatures are arranged so that the inner one makes before the outer one breaks.

The operation of the first supply unit is as follows: When the start switch 27 (which normally will be operated automatically by another part of the system, not shown) is closed, relay DC is energized, connecting the anode supply to the amplifiers and ground to line 28 which extends to the outer left-hand armatures of input relays IR1, IR2 and IR3. One brush, for instance 24, of interrupter 22 will be grounded and will energize the corresponding input and output relays, in this case IR1 and OR1, which will pull up and lock to the ground at relay DC. Relay IR1 will connect the 66⅔ cycle source terminal 2 to amplifier 8, whose output will be conducted through contacts of OR1 and transformer 15 and applied across output terminals 18 and 19. When segment 23 grounds brush 25, relays IR2 and OR2 will be energized and lock in similar manner, the operation of IR2 breaking the locking circuit of IR1 and OR1. The 50 cycle current from source terminal 3 will pass through amplifier 8 and be furnished to output terminal 20. After two seconds relay IR3 and OR3 will operate, cutting off IR2 and OR2 and supplying 33⅓ cycle current to output terminal 21. The cycle is automatically repeated as long as start switch 27 is closed, so that a circuit connected to any output terminal 19, 20 or 21 will receive successive cycles of two seconds of ringing current and four seconds of silence, at the selected frequency.

The second supply unit is similarly arranged and operated, but provides only two frequencies, illustrating the flexibility of the system. It includes two input relays IR4, IR5; two output relays OR4, OR5, with output transformers 29, 30 connected to output terminals 31, 32, and an amplifier 33. The left inner armatures of IR4 and IR5 are connected to the 25 cycle source terminal 5 and the 16⅔ cycle source terminal 6, respectively, so that these frequencies after amplification are applied to terminals 31 and 32. The energizing circuits of IR4 and OR4 in parallel are connected to the energizing circuit of IR1 and are closed when brush 24 contacts segment 23, while the parallel energizing circuits of IR5 and OR5 are similarly connected to the energizing circuit IR2 and closed by brush 25.

The arrangement for opening the locking circuit is somewhat different since only two frequencies are handled. The inner right armature of IR4 locks through the outer left armature of IR5 to line 28; but the locking circuit of IR5 extends from its inner right work contact over line 34 to the outer left rest contact of relay IR3, so that relays IR5 and OR5 are released when relay IR3 is operated. This arrangement maintains the proper timing in the second supply unit even though there is a break in the cycle of operation.

In systems of this type continuous operation of the amplifier tubes during stand-by periods is undesirable, but it is also undesirable to delay operation until the tubes heat up. An arrangement has been provided which reduces greatly the current used during idle periods and increases the tube life, while maintaining the tubes in condition for use without appreciable delay. It is illustrated in connection with the first supply unit, in which the heaters of tubes 9 and 10 are connected between a current source 35 and the middle armature of relay DC, whose rest contact is connected through resistor 36 to the rest contact of the grounded inner armature of the latter relay. The work contact of said middle armature is connected through the heaters of tubes 11 and 12 to ground.

With this arrangement, when in stand-by condition with switch 27 open and relay DC off, the heaters of tubes 9 and 10 are heated through resistor 36, which keeps them slightly below operating temperature, reducing current drain and electron emission. The heaters of tubes 11 and 12 are cold. When switch 27 is closed and relay DC pulls up, the heaters of all the tubes are connected by the second armature directly between the current source and ground, resistor 36 being cut out. Tubes 9 and 10 are placed in operation at once, and it has been found that with this arrangement any delay in bringing tubes up to operating temperature is not commercially important.

While an illustrative embodiment has been described and shown, it may be varied without departing from the invention. The supply unit is clearly adapted to handle any number of frequencies up to that which is determined by dividing the silence time by the ringing time, and adding one. Also, while uniform time intervals are shown, the system is not limited thereto as the timing is determined by brush location. The system is adapted to use any desired number of supply units, all governed by the common control. Regarding the standby tube heating system, it should be noted that the number of tubes that are provided with such heating can be selected in accordance with the circuits and tubes used in the amplifier.

What is claimed is:

1. A ringing current supply system comprising a plurality of sources of alternating current, the current from each source having a different frequency, a plurality of output stations, an amplifier unit having input and output circuits, a series of input relays, circuit means for energizing said relays in cyclic succession, a circuit from each source extending through work contacts of a different relay to said input circuit, a series of output relays, circuit means for energizing the output relays in cyclic succession in synchronism with the input relays, and a circuit from each output station extending through work contacts of a different output relay to said output circuit.

2. A supply system as set forth in claim 1 in which each input relay is connected in the same circuit as an output relay, and further comprising a common control device for each of said circuit means of said input and output relays.

3. A ringing current supply system for telephone systems employing a ringing period followed by a silence period that is substantially a multiple of the ringing period, comprising signaling means for supplying currents at a number of frequencies, a plurality of amplifying units, circuit means for passing through one unit in cyclic succession a number of currents equal to said multiple plus one, circuit means including an input switching system and an output switching system connected to each amplifier unit, a common control means for all of said switching systems for passing additional currents in cyclic succession through each other unit, and means controlling the period each current is passed through a unit such that said period is equal to the ringing period.

4. A ringing current supply system for telephone systems employing a ringing period followed by a silence period that is substantially a multiple of the ringing period, comprising signaling means for supplying currents at a number of frequencies, a plurality of amplifying units, and circuit means for passing through each unit in cyclic succession a number of said currents not greater than said multiple plus one, said circuit means including step switching means connected to each unit and common actuating means for said switching means, said actuating means being operative to pass each current through said amplifying units during a period equal to said ringing period.

5. A supply system as set forth in claim 4 in which each of said step switching means includes a series of input relays and a series of output relays, each input and output relay of a series being connected in a common circuit, and said actuating means includes timing means for synchronously energizing the relays of each series in cyclic succession, an input relay and an output relay of each series being simultaneously energized.

6. A ringing current supply system for telephone systems comprising signaling means for supplying currents at a number of frequencies, amplifying means, circuit means for passing said currents through said amplifying means in cyclic succession, starting means for actuating said circuit means, said amplifying means including a plurality of vacuum tubes each having a heater element, switch means under control of said starting means for maintaining the heater element of at least one tube at the input of the amplifying means in heated condition below the tube operating temperature when no current is being passed through the latter means, and means whereby said switch is actuated by said starting means to apply normal operating heating current to said heater elements.

7. A supply system as set forth in claim 6 in which said starting means includes a switching device having a standby and operating position of operation, a standby current supply circuit connected to each heater element that is maintained below operating temperature, said circuit extending through said switching device and means for closing said circuit when the device is in said standby position.

ELMER F. LEWIS.

REFERENCES CITED

The following references are of record in the file of this patent:

UNITED STATES PATENTS

| Number | Name | Date |
|---|---|---|
| 1,251,363 | Gherrardi | Dec. 25, 1917 |
| 1,546,427 | Affel | July 21, 1925 |
| 1,981,113 | Mitchell | Nov. 20, 1934 |
| 2,092,442 | Calwell | Sept. 7, 1937 |
| 2,104,844 | Affel | Jan. 11, 1938 |
| 2,273,193 | Heising | Feb. 17, 1942 |
| 2,325,829 | Boswan | Aug. 3, 1943 |
| 2,346,504 | Place | Apr. 11, 1944 |
| 2,438,902 | Deloraine | Apr. 2, 1948 |